United States Patent

Nomura et al.

[11] Patent Number: 5,065,573
[45] Date of Patent: Nov. 19, 1991

[54] HYDRAULIC POWER BOOSTER INCLUDING BACKUP ACTUATOR IN ADDITION TO LEVER DEVICE, FOR BOOSTER CONTROL VALVE

[75] Inventors: Yoshihisa Nomura; Masahiko Kato; Michiharu Nishii, all of Toyota, Japan

[75] Inventors: Yoshihisa Nomura, Toyota; Masahiko Kato, Toyoake; Michiharu Nishii, Toyota, all of Japan

[21] Appl. No.: 552,896

[22] Filed: Jul. 16, 1990

[30] Foreign Application Priority Data

Jul. 25, 1989 [JP] Japan .................. 1-192391

[51] Int. Cl.[5] .............................................. B60T 13/20
[52] U.S. Cl. ........................................ 60/551; 60/555; 60/582; 60/547.1
[58] Field of Search .................. 60/547.1, 552, 555, 60/556, 557, 558, 559, 582, 548, 551, 547.2, 547.3; 91/369.4, 374, 376 R, 378, 388

[56] References Cited

U.S. PATENT DOCUMENTS

| | | | |
|---|---|---|---|
| 3,064,431 | 11/1962 | Schnell | 60/551 X |
| 3,638,427 | 2/1972 | Meyers | 60/548 X |
| 3,978,667 | 9/1976 | Ohara | 60/547.1 X |
| 3,995,529 | 12/1976 | Bach et al. | 60/547.1 X |
| 4,034,566 | 7/1977 | Suketomo et al. | 60/582 X |
| 4,114,376 | 9/1978 | Cattaneo et al. | 60/555 X |
| 4,123,908 | 11/1978 | Bertone et al. | 60/548 |
| 4,218,887 | 8/1980 | Dauvergne | 60/551 X |
| 4,311,085 | 1/1982 | Runkle | 60/547.1 X |
| 4,732,429 | 3/1988 | Belart et al. | 60/582 X |

FOREIGN PATENT DOCUMENTS

| | | | |
|---|---|---|---|
| 2343882 | 4/1975 | Fed. Rep. of Germany | 60/582 |
| 58-61057 | 4/1983 | Japan . | |
| 62-155167 | 7/1987 | Japan . | |
| 1-278873 | 11/1989 | Japan . | |

Primary Examiner—Edward K. Look
Assistant Examiner—John Ryznic
Attorney, Agent, or Firm—Oblon, Spivak, McClelland, Maier & Neustadt

[57] ABSTRACT

A hydraulic power booster having a lever device disposed in operative association with a reaction piston, a power piston and a valve spool, for moving the valve spool in one of opposite axial directions thereof for applying a pressure of a pressure source into a power chamber to advance the power piston, in response to a relative movement between the reaction and power pistons. The booster is provided with a backup actuator including a cylinder, and a valve drive piston which slidably engages the cylinder. The cylinder and the valve drive piston cooperate with each other to define a first fluid chamber communicating with the power chamber, and a second fluid chamber communicating with a pressure chamber in which a pressure is generated according to an advancing force of the power piston. The valve drive piston moves the valve spool in the above-indicated one axial direction, in engagement with the valve spool, when the valve drive piston is moved in a direction from the second fluid chamber toward the first fluid chamber.

13 Claims, 2 Drawing Sheets

HYDRAULIC POWER BOOSTER INCLUDING BACKUP ACTUATOR IN ADDITION TO LEVER DEVICE, FOR BOOSTER CONTROL VALVE

BACKGROUND OF THE INVENTION

1. Field of the Invention

The present invention relates to a hydraulic power booster adapted to produce a boosted output in response to an input, for example, a boosted braking pressure used in a hydraulically operated brake system.

2. Discussion of the Prior Art

A hydraulic power booster as indicated above is known. An example of the power booster used for a hydraulically operated brake is disclosed in laid-open Publication No. 62-155167 of unexamined Japanese Patent Application. This hydraulic power booster includes (a) a reaction piston linked with a brake pedal, (b) a power piston which is axially movable relative to the reaction piston, (c) a valve spool for controlling the pressure in a power chamber, and (d) a lever device disposed in operative association with the reaction piston, power piston and valve spool, for moving the valve spool in response to a relative movement between the reaction and power pistons. For instance, the lever device includes a first link which is pivotally supported at one end thereof by the housing of the booster and which engages the reaction piston at the other end, and a second link which engages the power piston and the end face of the valve spool at the opposite ends, respectively, and which is pivotally connected to an intermediate portion of the first link. Upon depression of the brake pedal, a resulting advancing movement of the reaction piston relative to the power piston causes the first and second links of the lever device to cooperate with each other to advance the valve spool. The movement of the valve spool causes a relatively high pressure to be supplied from a hydraulic power source into the power chamber, whereby the high pressure in the power chamber acts on the power piston, which operates to raise the pressure in a master cylinder operatively connected to the booster. When the master cylinder is used for a vehicle brake system, the pressure produced by the master cylinder with the aid of the booster is applied to a brake cylinder provided for a wheel of the vehicle. In some cases, the boosted pressure in the power chamber is directly applied to the wheel brake cylinder.

In the event the lever device fails to normally function for some reason or other, the valve spool cannot be moved, and the high pressure is not applied to the power chamber, namely, the hydraulic power booster fails to normally operate to boost the input force.

SUMMARY OF THE INVENTION

It is therefore an object of the present invention to provide a hydraulic power booster which assures a normal operation of the valve spool, even in the event of failure of the lever device.

The above object may be achieved according to the principle of the present invention, which provides a hydraulic power booster having a lever device disposed in operative association with a reaction piston, a power piston and a valve spool, for moving the valve spool in one of opposite axial directions thereof for applying a pressure of a pressure source into a power chamber to advance said power piston, in response to a relative movement between the reaction and power pistons, the booster comprising a backup actuator including a cylinder, and a valve drive piston which slidably engages the cylinder. The cylinder and the valve drive piston cooperate with each other to define a first fluid chamber communicating with the power chamber, and a second fluid chamber communicating with a pressure chamber in which a pressure is generated according to an advancing force of the power piston. The valve drive piston moves the valve spool in the above-indicated one axial direction, in engagement with the valve spool, when the valve drive piston is moved in a direction from the second fluid chamber toward the first fluid chamber.

In the hydraulic power booster of the present invention constructed as described above, the backup actuator does not operate to activate the valve spool while the lever device is normally functioning. In the event that the lever device fails to normally function for some reason or other, the backup actuator acts on the valve spool to move the valve spool for applying the pressure of the pressure source to the power chamber. Where the booster is used for a hydraulically operated brake system, for example, an ordinary or normal operation of a brake pedal causes a relative movement between the reaction and power pistons, which causes the lever device to move the valve spool before the valve drive piston is moved due to an increase in the pressure in the second fluid chamber. Accordingly, the pressure in the power chamber and the pressure in the first fluid chamber rise to overcome the pressure in the second fluid chamber, whereby the valve drive piston is usually held in the non-operated position and does not act on the valve spool. If the lever device fails to normally function, however, the valve spool is not moved by a movement of the reaction piston relative to the power piston which is caused by an operation of the brake pedal. Therefore, the pressure in the power chamber and the pressure in the first fluid chamber will not rise. When the power piston is moved by a further operation of the brake pedal, the pressure in the second fluid chamber is raised, and the valve drive piston of the backup actuator is moved in the direction toward the first fluid chamber, thereby moving the valve spool so as to apply the relatively high pressure to the power chamber.

As explained above, the backup actuator provided to back up the lever device does not prevent or disturb the operation of the lever device as long as the lever device is normally functioning. Only after the lever device becomes defective, the valve drive piston of the backup actuator acts on the valve spool. Therefore, the present hydraulic power booster operates in the same manner as the known booster of the same type, as far as the lever device is able to normally function, and the backup actuator assures the intended power boosting function of the present booster in the event of failure of the lever device. Thus, the present booster has improved operating reliability, and is relatively economical to manufacture, owing to the mere addition of the backup device to the conventional arrangement. Since the valve drive piston and the cylinder slidably receiving the piston are comparatively simple parts, the addition of the backup actuator does not considerably increase the cost of manufacture of the booster.

The pressure chamber with which the second fluid chamber of the backup actuator communicates may be a pressure chamber provided in a master cylinder operatively connected to the booster. Alternatively, the pressure chamber in question may be a chamber exclusively formed within the booster, such that the pressure in that chamber increases with the force of advancing the power piston.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
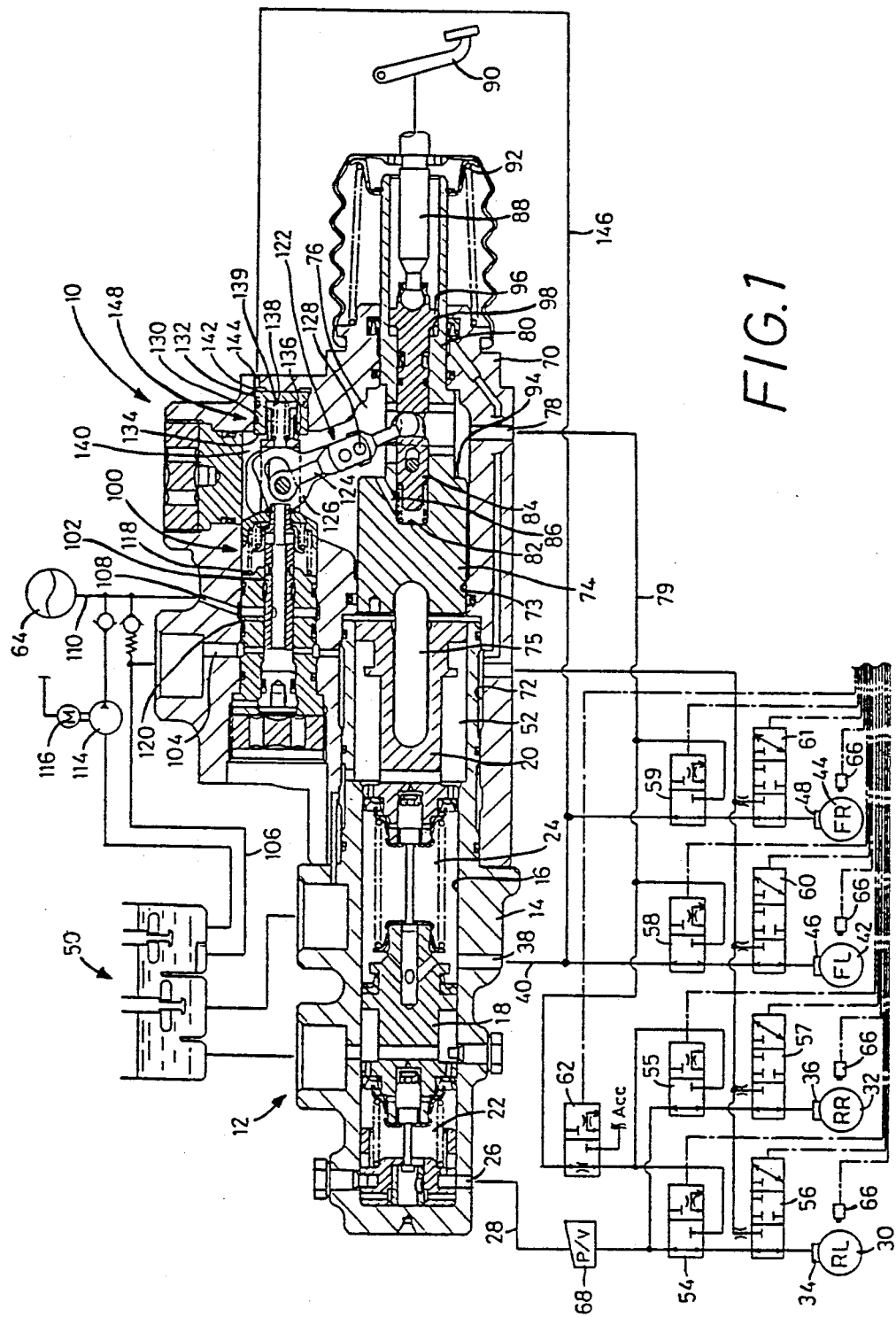
FIG. 1 is a front elevational view in cross section showing one embodiment of a hydraulic power booster of this invention as applied to a hydraulically operated brake system.

Referring first to FIG. 1, reference numeral 10 denotes a hydraulic power booster (hereinafter referred to as "booster"), which is operatively connected to a master cylinder 12 of a hydraulically operated brake system for a motor vehicle.

The master cylinder 12 includes a housing 14 having a cylinder bore 16 in which a first and a second pressurizing piston 18, 20 are fluid-tightly and axially slidably received. The housing 14 and the first pressurizing piston 18 cooperate with each other to define a first pressure chamber 22 in front of the piston 18. The housing 14 cooperates with the first and second pressurizing pistons 18, 20 to define a second pressure chamber 24 between the two pistons 18, 20.

A fluid pressure generated in the first pressure chamber 22 is applied through a port 26 and a fluid passage 28, to rear wheel cylinders 34, 36 provided for a left and a right rear wheel 30, 32 of the vehicle. A fluid pressure generated in the second pressure chamber 24 is applied through a port 38 and a fluid passage 40, to front wheel cylinders 46, 48 provided for a left and a right front wheel 42, 44 of the vehicle. Thus, the brake system has two mutually independent arrangements, one for applying the pressure in the first pressure chamber 22 to the rear wheel cylinders 34, 36, and the other for applying the pressure in the second pressure chamber 24 to the front wheel cylinders 46, 48. The second pressurizing piston 20 has an annular groove formed in its outer circumferential surface, whereby an annular low-pressure chamber 52 is defined by the housing 14 and the piston 20. The low-pressure chamber 52 communicates with a reservoir 50.

Two solenoid-operated directional control valves 54, 56 are disposed between the first pressurizing chamber 22 and the left rear wheel cylinder 34, while two solenoid-operated directional control valves 55, 57 are disposed between the chamber 22 and the right rear wheel cylinder 36. Similarly, two solenoid-operated directional control valves 58, 60 are disposed between the second pressure chamber 24 and the left front wheel cylinder 46, while two solenoid-operated directional control valves 59, 61 are disposed between the chamber 24 and the right front wheel cylinder 48. The directional control valves 54, 55 are connected to the booster 10 via a solenoid-operated directional control valve 62 and through a fluid passage 79, so that a pressure in the booster 10 may be applied to the rear wheel cylinders 34, 36, in place of the pressure in the first pressure chamber 22. The directional control valves 58, 59 are also connected to the booster 10 through the fluid passage 79, so that the pressure in the booster 10 may be applied to the front wheel cylinders 46, 48, in place of the pressure in the second pressure chamber 24.

The directional control valve 62 is provided for effecting a traction control operation for regulating the brake pressures in the rear wheel cylinders 34, 36. More specifically, the directional control valve 62 has a first position for fluid communication of the directional control valves 54, 55 (rear wheel cylinders 34, 36) with the booster 10, and a second position for fluid communication with the valves 54, 55 with an accumulator 64 of the brake system. The valve 62 is placed in the second position when the traction control operation is effected.

The solenoid-operated directional control valves 54, 55, 58, 59, 62 are operated under the control of a suitable control device. The solenoid-operated directional control valves 56, 57, 60, 61 are provided for effecting an anti-skid or anti-lock brake control operation for regulating the brake pressures for the rear and front wheels 30, 32, 42, 44, so that the speeds of the wheels under braking are controlled to be held within an optimum range so as to prevent skidding or locking of the wheels. Each of these valves 56, 57, 60, 61 is a three-position valve which has a pressure increase position, a pressure hold position and a pressure decrease position, for increasing, holding and decreasing the pressure in the corresponding wheel cylinder 34, 36, 46, 48. These three positions of the valves 56, 57, 60, 61 are selectively established by the control device, depending upon outputs of wheel speed sensors 66 provided to detect the rotating speeds of the wheels 30, 32, 42, 44. The control device is turned on when an ignition switch of the vehicle is turned on. Since the anti-lock brake control operation is well known in the art and the understanding thereof is not essential to the understanding of the principle of the present invention, no further description is deemed necessary.

In a portion of the fluid passage 28 between the first pressure chamber 22 and the solenoid-operated directional control valves 54, 55, there is provided a proportioning valve 68.

The housing 14 of the master cylinder 12 is partially fitted in a hole 72 formed in a housing 70 of the booster 10, such that the cylinder bore 16 of the housing 14 communicates with a cylinder bore 73 formed in the housing 70. A power piston 74 is fluid-tightly and axially slidably received in the cylinder bore 73, in concentric relation with the second pressurizing piston 20, so that an axial force acting on the power piston 74 is transmitted to the second pressurizing piston 20 through a relay rod 75.

A portion of the cylinder bore 73 behind the power piston 74 serves as a power chamber 76 which communicates with the directional control valves 58, 59, 62, via a port 78 and through the fluid passage 78. The power piston 74 has a small-diameter portion 80 which extends rearwardly from a front large-diameter portion, such that the small-diameter and large-diameter portions are concentric with each other. The small-diameter portion 80 fluid-tightly and slidably penetrates the end wall of the housing 70, and projects into the atmosphere.

The small-diameter portion 80 has a hole 82 axially formed therethrough. In this blind hole 82, there is fluid-tightly and axially slidably received a reaction piston 84 which is connected to an input rod 88. The end of the reaction piston 84 remote from the input rod 88 cooperates with the bottom portion of the hole 82 to define a space which communicates with the power chamber 76 through a communication passage 86. In this arrangement, the input rod 88 receives a reaction force which is proportional to the fluid pressure in the power chamber 76. The input rod 88 is connected at its inner end to the outer end of the reaction piston 84, and is linked at its outer end with a brake pedal 90.

The power piston 74 is biased rearwardly (in the right direction, as seen in FIG. 1) toward its fully retracted position, by a return spring 92 disposed between the small-diameter portion 80 and the housing 70. The fully retracted position is established by abutting contact of a shoulder 94 of the piston 74 with a shoulder formed with the cylinder bore 73. On the other hand, the fully advanced position of the reaction piston 84 relative to the power piston 74 is established by abutting contact of a flange portion 96 of the piston 84 with a shoulder 98 formed with the hole 82.

The booster 10 is provided with a booster control valve 100 including a valve spool 102 which is fluid-tightly and axially slidably supported by the housing 70. The housing 70 has a low-pressure port 104 connected to the reservoir 50 through a fluid passage 106, and a high-pressure port 108 which is located rearwardly of the low-pressure port 104. The high-pressure port 108 is connected to the accumulator 64 through a fluid passage 110. The accumulator 64 is charged with a pressurized brake fluid which is supplied from the reservoir 50 by a pumping action of a pump 114 driven by a motor 116. The pressure of the fluid stored in the accumulator 64 is regulated to within a predetermined range, by the control device of the brake system, which controls the operation of the motor 116, based on an output signal of a suitable pressure sensor.

The valve spool 102 is biased by a spring 118 toward its fully retracted position or non-operated position indicated in FIG. 1. In this fully retracted or non-operated position, the low-pressure port 104 communicates with the power chamber 76 through a communication hole 120 formed through the spool 102, while the high-pressure port 108 is closed by the spool 102. When the valve spool 102 is advanced by a predetermined distance (in the left direction as viewed in FIG. 1), the low-pressure port 104 and the high-pressure port 108 are both closed by the spool 102. A further advancing movement of the spool 102 causes the low-pressure port 104 to remain closed, and brings the high-pressure port 108 into communication with the power chamber 76.

A lever device indicated generally at 122 is disposed in operative association with the valve spool 102 of the booster control valve 100, the reaction piston 84 and the power piston 74. The lever device 122 includes a first link 124 and a second link 126. The first link 124 is pivotally supported at one end thereof by the housing 70, and engages the reaction piston 84 at the other end. The second link 126 is pivotally connected by a pin 128 to an intermediate portion of the first link 124. Further, the opposite ends of the second link 126 engage the power piston 74 and the end face of the valve spool 102, respectively.

In operation of the lever device 122, an advancing movement of the reaction piston 84 relative to the power piston 74 causes a clockwise pivotal movement of the first link 124 (as viewed in FIG. 1), whereby the second link 126 is pivoted counterclockwise about the pin 128. As a result, the valve spool 102 is advanced. Thus, the booster control valve 100 is operated. It will be understood that the lever device 122 functions to convert a relative movement of the reaction and power pistons 84, 74 into a movement of the valve spool 102 of the booster control valve 100.

The housing 70 also has a hole 130 which is open to the power chamber 76. A valve drive piston 132 slidably engages the hole 130. The piston 132 is a cup-shaped member whose annular end face 134 is adapted to abut on a shoulder 136 of the valve spool 102 of the booster control valve 100. Normally, however, the piston 132 is held in the fully retracted position (non-operated position indicated in FIG. 1) under a biasing force of a spring 139 disposed between a bottom wall 138 thereof and the valve spool 102. With the piston 132 received in the hole 130, a first fluid chamber 140 is provided in front of the piston 132, and a second fluid chamber 142 is provided behind the piston 132. Namely, the first and second fluid chambers 140, 142 are formed on the opposite sides of the piston 132.

The first fluid chamber 140 communicates with the power chamber 76, while the second fluid chamber 142 is connected to the second pressure chamber 24 of the master cylinder 12, via a port 144 and through a fluid passage 146 and the fluid passage 40. Accordingly, an increase in the pressure in the second pressure chamber 24 causes an increase in the pressure in the second fluid chamber 142. When the pressure in the second fluid chamber 142 overcomes the biasing force of the spring 139 and the pressure in the first fluid chamber 140, the piston 132 is advanced toward the first fluid chamber 140, and the annular end face 134 of the piston 132 is eventually brought into abutting contact with the shoulder 136, whereby the valve spool 102 is advanced for fluid communication between the high-pressure port 108 (accumulator 64) and the power chamber 76.

It will be understood that the portion of the housing 70 defining the hole 130 serves as a cylinder, and that this cylinder cooperates with the piston 132 to provide a backup actuator 148 adapted to advance the valve spool 102 of the booster control valve 100 from its non-operated position.

In the hydraulically operated brake system constructed as described above, a computer which constitutes a major portion of the control device is initialized upon starting of the vehicle engine. If the traction control operation is effected by the brake system due to an excessively high slip ratio of the rear drive wheel or wheels 30, 32, the solenoid-operated directional control valves 62, 54, 55 are operated so as to supply the pressurized fluid of the accumulator 64 to the directional control valves 56, 57, which are controlled to regulate the brake pressures in the rear wheel cylinders 34, 36.

When the brake pedal 90 is depressed to apply brake to the running vehicle, the rear wheel cylinders 34, 36 are supplied with the pressurized fluid delivered from the first pressure chamber 22 of the master cylinder 12. At the same time, the directional control valves 58, 59 are switched to the positions for applying the pressure in the power chamber 76 to the front wheel cylinders 46, 48. Thus, the brake is applied to the vehicle.

In the event of an excessively high slip ratio of any wheels 30, 32, 42, 44, the anti-lock brake control operation is initiated for the excessively slipping wheel or wheels, with the directional control valves 54, 55 as well as the directional control valves 58, 59 operated to permit the fluid communication of the power chamber 76 with the rear wheel cylinders 34, 36, as well as the fluid communication of the power chamber 76 with the front wheel cylinders 46, 48. The appropriate directional control valve or valves 56, 57, 60, 61 is/are operated so as to control the pressure or pressures in the corresponding wheel cylinder or cylinders 34, 36, 46, 48, so that the slip ratio of each wheel 30, 32, 42, 44 is maintained within an optimum range.

During the anti-lock brake control operation, the valve spool 102 of the booster control valve 100 is normally moved by means of the lever device 122.

Figure 2:
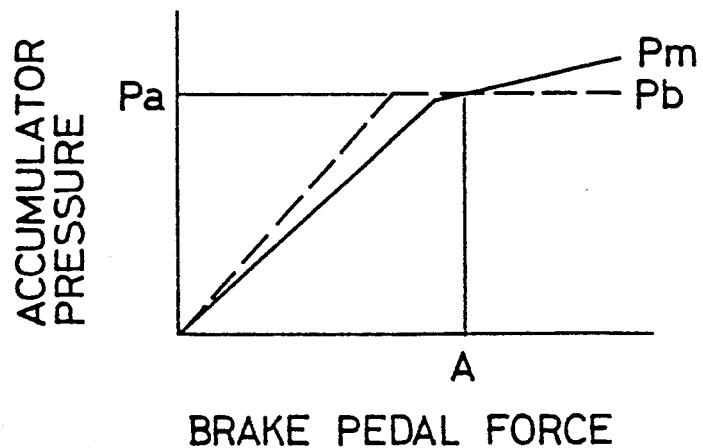
FIG. 2 is a graph indicating changes in pressures in a power chamber and a second pressure chamber.

Referring to the graph of FIG. 2, "Pa", "Pb" and "Pm" represent the pressure in the accumulator 64, the pressure in the power chamber 76, and the pressure in the second pressure chamber 24, respectively. When an operating force acting on the brake pedal 90 (brake pedal force) exceeds a value "A" after the pressure "Pb" in the power chamber 76 has become equal to the pressure "Pa" in the accumulator 64 (namely, after the maximum boosting capacity of the booster 10 is reached), the pressure "Pm" in the second pressure chamber 24 becomes higher than the pressure "Pb" in the power chamber 76. The pressure "Pm" in the second pressure chamber 24 is lower than the pressure "Pb" in the power chamber 76, until the brake pedal force reaches the limit "A". That is, the cross sectional areas of the reaction and power pistons 84, 74, the biasing force of the return spring 92, and the other factors are determined so that the booster 10 provides the relationship as indicated in the graph of FIG. 2.

Accordingly, as long as the lever device 122 is normally functioning, an increase in the pressure "Pm" in the second pressure chamber 24 as a result of an operation of the brake pedal 90 will not cause the backup actuator 148 to activate the valve spool 102 of the booster control valve 100. When the brake pedal force exceeds the limit "A", the piston 132 of the backup actuator 148 is moved toward the first fluid chamber 140 due to the difference between the pressures in the second fluid chamber 142 and the power chamber 76, namely, between the pressures "Pm" and "Pb". However, the valve spool 102 has been moved to its advanced position by the normally functioning lever device 122 before the piston 132 is advanced, whereby the advancing piston 132 does not act on the fully advanced valve spool 102. In other words, the backup actuator 148 does not activate the booster control valve 100.

When the brake is released with the brake pedal 90 returned to the non-operated position, the reaction and power pistons 84, 74 are retracted to the fully retracted positions, and the valve spool 102 is returned to the non-operated position under the biasing force of the spring 118. The return or retracting movement of the valve spool 102 is not prevented or disturbed by the piston 132, since the piston 132 is usually held in its non-operated position, and since the piston 132 which has been advanced for the reason as described above is retracted to the fully retracted or non-operated position as the pressure "Pm" in the second pressure chamber 76 is lowered.

In the event the lever device 122 becomes defective or fails to normally function for some reason or other, the valve spool 102 is not advanced as the reaction piston 84 is moved relative to the power piston 74. With the brake pedal 90 further depressed, the flange portion 96 of the reaction piston 84 is brought into abutting contact with the shoulder 98 of the power piston 74, whereby the power piston 74 is advanced. As a result, the second pressurizing piston 20 is advanced by the power piston 74 through the relay rod 75, and the pressure "Pm" in the second pressure chamber 24 is increased. The increased pressure "Pm" is applied to the second fluid chamber 142 of the backup actuator 148 through the fluid passages 40, 146. Consequently, the piston 132 is advanced, thereby advancing the valve spool 102 so that the high-pressure port 108 is brought into communication with the power chamber 76, and the pressure "Pa" in the accumulator 64 is applied to the power chamber 76. When the pressure "Pb" in the power chamber 76 is raised to a level which is almost equal to the pressure in the second fluid chamber 142, the piston 132 is retracted, whereby the valve spool 102 is returned to disconnect the power chamber 76 from the accumulator 64.

In the case where the valve spool 102 is advanced by the backup actuator 148, the initiation of the advancing movement of the valve spool 102 is delayed as compared with the case where the valve spool 102 is normally advanced by the lever device 122. The amount of this delay corresponds to the time required for the pressure "Pm" in the second pressure chamber 24 to rise by the advancing movement of the second pressurizing piston 20. However, this delay has substantially no influence on the braking effect provided by the wheel cylinders. Namely, the booster valve 100 is operated in substantially the same manner as in the case where the lever device 122 is normally functioning.

While the present invention has been described in its presently preferred embodiment with a certain degree of particularity, it is to be understood that the invention is not limited to the details of the illustrated embodiment, and that the invention may be embodied otherwise.

Figure 3:
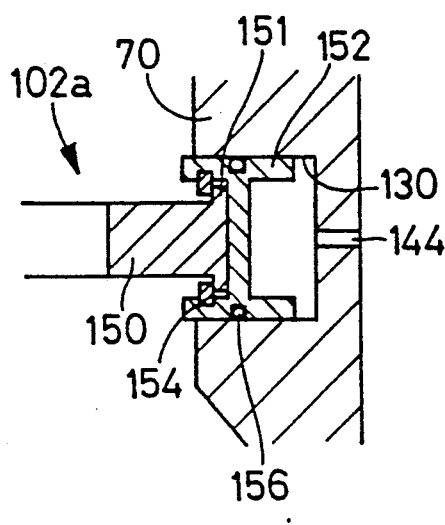
FIG. 3 is a fragmentary view in cross section illustrating a modified embodiment of the invention.

In the illustrated embodiment of FIG. 1, the piston 132 of the backup actuator 148 is normally held in its non-operated position by the spring 139. However, the piston of the backup actuator may be adapted to move with the valve spool when the valve spool is moved by the lever device 122. One example of this modified arrangement is illustrated in FIG. 3, in which a valve spool 102a of the booster control valve 100 has an end portion 150 which has a flange portion 151 formed at its extreme end, while a piston 152 of the backup actuator slidably received in the hole 130 engages with the flange portion 151, by means of a retainer ring 154 attached to the piston 152. In this case, the piston 152 of the backup actuator is moved frequently with the valve spool 102a, even while the lever device 122 is normally functioning, and the otherwise possible sticking of a sealing member 156 for the backup actuator piston 152 may be avoided.

Although the backup actuator 148 used in the illustrated embodiment is adapted to push the valve spool 102, it is possible that the valve spool 102 is advanced by a backup actuator located in front of the valve spool 102, such that the backup actuator pulls the spool 102, in engagement with the front end portion of the spool 102.

It is to be understood that the invention may be embodied with various other changes, modifications and improvements, which may occur to those skilled in the art, without departing from the spirit and scope of the invention defined in the following claims.

What is claimed is:

1. A hydraulic power booster having a power piston and a valve spool, for applying a pressure of a pressure source into a power chamber to advance said power piston, aid hydraulic power booster comprising:
- a reaction piston movable relative to said power piston;
- a lever device disposed in operative association with said reaction and power pistons and said valve spool, for moving said valve spool in one of opposite axial directions of the valve spool, in response to a relative movement between said reaction and power pistons; and
- a backup actuator including a cylinder, and a valve drive piston which slidably engages said cylinder, said cylinder and said valve drive piston cooperating with each other to define a first fluid chamber communicating with said power chamber, and a second fluid chamber communicating with a pressure chamber in which a pressure is generated according to an advancing force of said power piston, said valve drive piston moving said valve spool in said one of opposite directions, in engagement with said valve spool, when said valve drive piston is moved in a direction from said second fluid chamber toward said first fluid chamber.

2. A hydraulic power booster according to claim 1, wherein said reaction piston is moved by a brake operating member, and said power piston is operatively connected to a pressurizing piston of a master cylinder in a hydraulically operated brake system, said master cylinder having said pressure chamber which is partially defined by said pressurizing piston.

3. A hydraulic power booster according to claim 1, wherein said reaction piston engages said power piston when said reaction piston is moved relative to said power piston by a predetermined distance, said reaction and power pistons being moved together after said reaction piston is moved relative to said power piston by said predetermined distance, so that the pressure in said pressure chamber is generated by movement of said power piston with said reaction piston.

4. A hydraulic power booster according to claim 1, wherein said valve drive piston of said backup actuator is engageable with said valve spool so as to push said valve spool when said valve drive piston is moved in said direction from said second fluid chamber toward said first fluid chamber.

5. A hydraulic power booster according to claim 1, wherein said backup actuator further includes biasing means for biasing said valve drive piston in a direction from said first fluid chamber toward said second fluid chamber, for normally placing said valve drive piston in a non-operated position in which said valve drive piston does not engage said valve spool.

6. A hydraulic power booster according to claim 1, wherein said valve drive piston of said backup actuator comprises a cup-shaped member having an annular end face on the side of said first fluid chamber, said annular end face being abuttable on a portion of said valve spool.

7. A hydraulic power booster according to claim 1, wherein said backup actuator further includes means for moving said valve drive piston with said valve spool.

8. A hydraulic power booster according to claim 1, wherein said power piston is operatively connected to at least one pressurizing piston which partially defines at least one pressure chamber.

9. A hydraulic power booster according to claim 8, wherein said at least one pressurizing piston constitutes a part of a master cylinder for operating at least one brake cylinder in a hydraulically operated brake system.

10. A hydraulic power booster according to claim 9, wherein said at least one brake cylinder comprises at least one wheel cylinder for applying brake to a wheel of a motor vehicle.

11. A hydraulic power booster according to claim 9, wherein said hydraulically operated brake system includes an accumulator as said pressure source.

12. A hydraulic power booster according to claim 9, wherein said brake system includes means for applying the pressure in said power chamber to said at least one brake cylinder.

13. A hydraulic power booster according to claim 1, wherein said valve spool has a non-operated position in which the pressure of said pressure source is not applied to said power chamber, and at least one operated position which includes a position in which the pressure of said pressure source is applied to said power chamber, said valve drive piston of said backup actuator moving said valve spool in said one of axial opposite directions from said non-operated position toward said at least one operated position.

* * * * *

UNITED STATES PATENT AND TRADEMARK OFFICE
CERTIFICATE OF CORRECTION

PATENT NO. : 5,065,573

DATED : November 19, 1991

INVENTOR(S) : Yoshihisa Nomura, et. al.

It is certified that error appears in the above-indentified patent and that said Letters Patent is hereby corrected as shown below:

On the Title page, item [75], (second occurrence) the inventor's data should read as following:
--Yoshihisa Nomura, Toyota; Masahiko Kato, Toyoake; Michiharu Nishii, Toyota, all of Japan--.

On the Title page, item [73], the assignees have been omitted, should be, --Toyota Jidosha Kabushiki Kaisha, Toyota; aisin Seiki Kabushiki Kaisha, Kariya, both of Japan--.

Signed and Sealed this

Fifteenth Day of June, 1993

Attest:

MICHAEL K. KIRK

Attesting Officer

Acting Commissioner of Patents and Trademarks